(12) United States Patent
Costantini et al.

(10) Patent No.: US 11,983,597 B2
(45) Date of Patent: May 14, 2024

(54) METHOD FOR MANUALLY READING A CODE, AND ASSOCIATED DEVICE

(71) Applicant: SAINT-GOBAIN GLASS FRANCE, Courbevoie (FR)

(72) Inventors: Daniele Costantini, Paris (FR); Jean-Baptiste Laudereau, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 170 days.

(21) Appl. No.: 17/426,955

(22) PCT Filed: Jan. 31, 2020

(86) PCT No.: PCT/EP2020/052396
§ 371 (c)(1),
(2) Date: Jul. 29, 2021

(87) PCT Pub. No.: WO2020/157260
PCT Pub. Date: Aug. 6, 2020

(65) Prior Publication Data
US 2022/0100981 A1  Mar. 31, 2022

(30) Foreign Application Priority Data

Jan. 31, 2019 (FR) ...................................... 1900892

(51) Int. Cl.
*G06K 7/10* (2006.01)
*G06K 7/14* (2006.01)
*G06V 10/22* (2022.01)

(52) U.S. Cl.
CPC ....... *G06K 7/10732* (2013.01); *G06K 7/1443* (2013.01); *G06V 10/225* (2022.01);
(Continued)

(58) Field of Classification Search
CPC ............ G06K 7/10732; G06K 7/1443; G06K 2007/10504; G06K 2007/10524;
(Continued)

(56) References Cited

U.S. PATENT DOCUMENTS 6,354,504 B1  3/2002 Sabourault
10,541,280 B1 * 1/2020 Krah ..................... G06F 3/0446
(Continued)

FOREIGN PATENT DOCUMENTS

EP  3 017 398 A1  5/2016
WO  WO 2014/128424 A1  8/2014
(Continued)

OTHER PUBLICATIONS

International Search Report as issued in International Patent Application No. PCT/EP2020/052396, dated Mar. 26, 2020.

*Primary Examiner* — Matthew Mikels
(74) *Attorney, Agent, or Firm* — Pillsbury Winthrop Shaw Pittman LLP

(57) ABSTRACT

A method for manually reading a code marked on an article having a first main face on a first side and a second main face, opposite the first main face, on a second side, wherein, with the article being fixed, a portable device equipped with an optical imaging system including at least one optical sensor is positioned on the first side of the article so as to place the optical sensor facing the code in a reading direction corresponding to the observation direction of the imaging system, and wherein, with the code being illuminated by a light source located on the second side of the article, at least one image of the code is acquired by the optical imaging system.

24 Claims, 7 Drawing Sheets

(52) U.S. Cl.
CPC .............. *G06K 2007/10504* (2013.01); *G06K 2007/10524* (2013.01)

(58) Field of Classification Search
CPC ........... G06K 7/10742; G06K 7/10821; G06K 7/10881; G06V 10/225
See application file for complete search history.

(56) References Cited

U.S. PATENT DOCUMENTS

| | | | | |
|---|---|---|---|---|
| 2002/0030817 A1* | 3/2002 | Matsumoto | ........ | G06K 7/10861 356/401 |
| 2005/0011957 A1* | 1/2005 | Attia | .................. | G06K 7/10722 235/462.46 |
| 2006/0043193 A1* | 3/2006 | Brock | ...................... | G06K 7/10 235/462.41 |
| 2018/0330135 A1* | 11/2018 | Suman | .................. | G06K 19/16 |

FOREIGN PATENT DOCUMENTS

| WO | WO 2015/001255 A1 | 1/2015 |
|---|---|---|
| WO | WO 2015/121550 A1 | 8/2015 |

\* cited by examiner

| 230 mA Luminance 2800 cd/m2 | Sample | VG10 | TSA | PLC |
|---|---|---|---|---|
| | LT | 10% | 70% | 92% |
| | DMC code | 2010665003 | 2010665153 | 920065318 |
| distance D1 (cm) | 6 | less easy | easy | no |
| | 10 | easy | easy | easy |
| | 14 | easy | easy | easy |
| | 18 | less easy | easy | easy |
| | 22 | difficult | easy | easy |
| | 80 | | easy | easy |

Fig. 6

| 108 mA<br>Luminance<br>1300 cd/m2 | Sample | VG10 | TSA | PLC |
|---|---|---|---|---|
| | LT | 10% | 70% | 92% |
| | DMC code | 2010665003 | 2010665153 | 920065318 |
| distance D1 (cm) | 6 | no | less easy | no |
| | 10 | no | easy | easy |
| | 14 | no | easy | easy |
| | 18 | no | easy | easy |
| | 22 | no | easy | easy |
| | 80 | no | easy | easy |

Fig. 7

| 53 mA Luminance 630 cd/m2 | Sample | VG10 | TSA | PLC |
|---|---|---|---|---|
| | LT | 10% | 70% | 92% |
| | DMC code | 2010665003 | 2010665153 | 920065318 |
| distance D1 (cm) | 6 | no | easy | no |
| | 10 | no | easy | easy |
| | 14 | no | easy | easy |
| | 18 | no | easy | easy |
| | 22 | no | easy | easy |
| | 80 | no | easy | easy |

Fig. 8

METHOD FOR MANUALLY READING A CODE, AND ASSOCIATED DEVICE

CROSS-REFERENCE TO RELATED APPLICATIONS

This application is the U.S. National Stage of PCT/EP2020/052396, filed Jan. 31, 2020, which in turn claims priority to French patent application number 1900892 filed Jan. 31, 2019. The content of these applications are incorporated herein by reference in their entireties.

The present invention relates to the manual reading of a code on an article, particularly a glass article.

Glass is generally manufactured in the form of a continuous ribbon, for example a continuous ribbon of float glass.

This ribbon is then cut into sheets of glass referred to as "motherglass"; which sheets are for example "PLF" (Large Format Glass Trays), typically of dimensions 3.21 m by approximately 6 m or "DLF" (Dimensions of Manufacturing Width), of dimensions of approximately 2.55 m by 3.21 m.

These large glass sheets can then be cut into smaller glass sheets, forming for example blanks for cutting pieces of glass with more or less complex shapes.

In order to provide traceability thereof, these sheets of glass may be marked using an identifier or code, particularly one-dimensional (i.e. a "bar code" or the like) or two-dimensional (i.e. "data matrix" or the like).

These codes are for example marked by means of electromagnetic radiation of any suitable type, preferably oriented perpendicularly to the glass sheet, i.e. to the general plane of the glass sheet.

They may contain any type of information such as, for example, a number serving as an identifier of the glass sheet, the location, time or date of manufacture, etc.

The codes marked in this way are read off in-line by automatic detection devices of scanner type, as mentioned for example in patent application WO 2014/128424.

Nonetheless, there are situations in which an operator wishes to manually read the code marked on a glass sheet:

On the production line, the glass sheets generally undergo one or more transformation steps, for example the deposition of one or more layers in a coater, or cutting, etc.

After each transformation step, it may be desirable to isolate and visually verify one or more randomly selected sheets in order to detect potential defects and to ensure that the quality corresponds to predetermined specifications, or else to verify matching between the defects of the sheet and those identified beforehand by automatic optical detection devices. During this visual verification, the operator reads the code of the glass sheet to identify it and/or to learn the characteristics thereof.

Further downstream in the process, before sending to the client, it is sometimes desirable to identify one of the glass sheets stored on an A-frame (generally the outermost sheet of the stack) in order to ensure that the glass sheets stored on said A-frame do indeed correspond to the client's order. In this case, the code may be placed either on the face located opposite the operator who wishes to read the code, or on the opposite side.

There is therefore a need to be able to manually read a code on an article, particularly a glass article, in a simple and reliable manner, regardless of the placement of the code on the glass.

The aim of the invention is to respond to this need.

This aim is achieved with a method for manually reading a code marked on an article, particularly a glass article, the article having a first main face on a first side and a second main face, opposite the first main face, on a second side, wherein, with the article being fixed, a portable device equipped with an optical imaging system comprising at least one optical sensor is positioned on the first side of the article so as to place the optical sensor facing the code in a reading direction corresponding to the observation direction of the optical imaging system, and wherein, with the code being illuminated by at least one light source located on the second side of the article, at least one image of the code is acquired by the optical imaging system.

Manual reading is intended here to mean reading involving an operator's intervention and employing a portable device (i.e. a device which can be carried and moved around by the operator).

Furthermore, an article is said to be fixed when it is not moved during the reading, as opposed particularly to reading referred to as "moving", carried out during a movement of the article, for example on a conveyor.

Finally, the observation direction of the optical imaging system may for example be the optical axis of the imaging system when the elements of the optical imaging system have rotational symmetry.

It should be noted that the optical imaging system may (or may not) comprise an integrated light source. This light source should be distinguished from the useful light source (hereinafter light source) located, according to the invention, on the second side of the article during the reading.

The method according to the invention makes it possible, by virtue of illuminating the second main face of the article, to reduce the visibility of defects in the code such as cracks or bubbles, by changing the contrast of the image acquired by the optical imaging system.

Indeed, when the code has defects such as cracks or bubbles, they scatter light, which may be captured by the optical imaging system and which may mask part of the code or prevent the correct resolution of the symbols constituting the code, for example. These defects can often lead to the decoding failing or even failing to detect the presence of the code.

The applicant noted the utility of associating the portable code reading device with a light source located on the second side of the article in order to highlight the code compared to the defects.

With these provisions, and by way of nonlimiting example, the symbols of the code may behave as small lenses, directing, focusing or defocussing, in the direction of the optical imaging system, the light emitted by a light source located on the second side of the article. The symbols then become more visible than the cracks which simply scatter the light, and a portable code reading device is able to decode the code more easily.

By way of further nonlimiting example, the symbols may rather behave as masks which prevent the light from the source located on the second side of the article from reaching the optical imaging system, unlike defects which allow light to pass. The symbols then have a different contrast from that of the defects, and a portable code reading device is also able to decode the code more easily. Particularly advantageously, the light source employed in the method of the invention therefore facilitates the reading off of a code of degraded quality by highlighting the symbols relative to the defects.

The reading of the code is thus improved relative to a reading which would take place without a light source on the second side, in particular when the quality of the code marking is poor.

Moreover, in the case of an article with low light transmission, the light source located on the second side of the article makes it possible to visualize and image a code marked on the face opposite the operator, in other words the second main face, or marked in the thickness of the article.

In the present description, article is intended to mean a substrate alone, for example a glass substrate, or such a substrate covered with one or more layers on one or each of the main faces thereof.

The substrate may for example be a sheet of float glass, particularly a PLF or DLF, as defined above.

The article (i.e. the substrate and optionally the layer(s) coating it, where appropriate) has a light transmission of at least 1%.

The substrate and/or the layer(s) optionally coating it may be absorbent: in this case, the light transmission of the article is typically between 1 and 70%. However, as an alternative, the light transmission may also be strictly greater than 70%.

The code may be one-dimensional, particularly a bar code, or two-dimensional, particularly a data matrix, QR code or the like.

According to one example, the code can be marked on the first or second main face of the article. According to another example, the code is marked in the thickness of the article.

The code may be marked by laser. By way of nonlimiting example, such a laser may be a $CO_2$ laser delivering pulses of a duration of a few tens of microseconds to a few milliseconds at a wavelength of between 9.4 and 10.6 µm. In this example, the laser pulses remove a part of the substrate in order to draw the symbols of the code there. When these symbols are illuminated by a light source, for example the previous light source placed on the second side of the article, they can for example scatter, reflect, focus or defocus the light and become visible to a code reading system. By way of further nonlimiting example, it is possible to mark the code by a pigment printing method. These pigments can for example be colored, absorbent or fluorescent pigments. The pigments may be dispersed in an organic or aqueous solvent and the solution is applied locally to print the symbols of the code. The solvent is then evaporated to create the adhesion of the pigments on the article. When these symbols are illuminated by a light source, for example the previous light source placed on the second side of the article, they can for example emit or reflect light or on the contrary mask it or not reflect it and thus be visualized by a code reading device.

Nonlimitingly, the light source located on the second side of the article is typically a white light source. It can also be beneficial to use a light source which emits preferentially at the wavelengths at which the article hardly absorbs.

According to a nonlimiting example, it comprises at least one organic light-emitting diode OLED device or, as an alternative, at least one LED device, associated with a diffuser.

The light source comprises at least one illuminating zone, by may optionally comprise a plurality of illuminating zones, separated from one another by dark zones, particularly masked zones.

Illuminating zone of the light source is intended herein to mean a zone of said source which actually illuminates, and particularly which is not masked. An illuminating zone therefore typically corresponds to an emitting surface of the light source.

In the case of an OLED device, the illuminating zone is for example the outer layer of the device. In the case of an LED device associated with a diffuser, the illuminating zone is the surface of the diffuser oriented toward the observer.

According to a provision of the invention, the at least one illuminating zone has a greater extent than the code, preferably 10 times greater. It should be noted that surface of the code is intended to mean the surface delimited by a curve or a set of closed straight line segments surrounding the code.

According to one example, the at least one illuminating zone is planar.

According to one example, the light source has a mean luminance (or light intensity per unit surface area) over its at least one illuminating zone of between 630 and 140000 $cd/m^2$, preferably between 2800 and 6000 $cd/m^2$ (for a bright field type illumination) or between 25000 and 140000 $cd/m^2$ (for a dark field type illumination). It is for example possible to verify such a value with a commercially available luminance meter.

According to one example, the luminance is substantially homogeneous to the naked eye over the whole of the at least one illuminating zone; in other words, the luminance of the light source over said illuminating zone is such that the homogeneity thereof, calculated as being 1−E/Lmean, is greater than 0.5, where E is the standard deviation of the luminance over its at least one illuminating zone and Lmean is the mean luminance over said illuminating zone.

According to an exemplary implementation, during the reading, the light source is aligned with the observation direction, which corresponds, for example, in the case of an optical imaging system with rotational symmetry, to the optical axis of the optical imaging system.

In an advantageous configuration of the invention, during the reading, the optical sensor observes an illuminating zone of the light source. The illumination thus obtained is said to be bright field illumination: this is direct illumination, i.e. oriented directly toward the optical sensor.

In this case, the distance, measured orthogonally to the main faces of the article, between the light source and the second main face of the article is between 6 and 16 cm, preferably between 10 and 14 cm.

In another configuration, the light source is configured and/or positioned such that, during the reading, the illumination is said to be dark field illumination: this is then indirect illumination, i.e. not oriented directly toward the optical sensor, so that said sensor observes a dark zone and only captures the light scattered by the code to be read.

According to one example of dark field type illumination, during the reading, the light source is aligned with the optical axis of the optical imaging system but comprises a dark zone surrounded by one or more illuminating zones, the optical sensor observing the dark zone.

For example, such a dark zone can be obtained by masking an illuminating zone of the light source.

In this case, the distance, measured orthogonally to the main faces of the article, between the light source and the second main face of the article is preferably between 1 and 5 cm.

According to another example of dark field type illumination, during the reading, the light source is simply offset relative to the optical axis of the imaging system. In this case, more specifically, the light source (and in particular the illuminating zones thereof) is not in the field of observation of the optical sensor.

According to an advantageous provision, the optical sensor comprises a matrix sensor. In a known way, a matrix sensor is composed of pixels forming a matrix of size n×m, with n and m being strictly greater than 1.

According to one example, the portable device further comprises an image processing unit.

According to an exemplary implementation, the method comprises a preliminary step of positioning the article in front of the light source, said light source being fixed.

According to another exemplary implementation, the method comprises a step of positioning the light source on the second side of the article before, simultaneously to, or after positioning the portable device, with the article being fixed.

According to a particularly advantageous provision, the portable device integrates the optical imaging system and the light source, and said device is deployed around an edge of the article in a position in which the optical sensor is located on the first side of the article facing the code in a reading direction corresponding to the observation direction of the optical imaging system, and the light source is arranged on the second side of the article.

The invention also relates to a portable device which is particularly suitable for implementing the method as defined previously, integrating an optical imaging system comprising at least one optical sensor, and a light source, the portable device being configured to be deployed around an edge of the article in a position in which the optical sensor is located on the first side of the article facing the code in a reading direction corresponding to the observation direction of the optical imaging system, and the light source is arranged on the second side of the article.

The portable device comprises for example a first branch carrying the optical imaging system and a second branch carrying the light source, the first and second branches being spaced apart from one another so as to define a receiving space between them.

According to one example, the device further comprises gripping means, particularly a handle.

The following characteristics, defined previously, are also applicable to said portable device:
- the light source may comprise at least one organic light-emitting diode OLED device. As an alternative, it may comprise at least one LED device, associated with a diffuser.
- the light source may have at least one illuminating zone and the extent of the at least one illuminating zone is between 5 and 900 cm².
- the at least one illuminating zone may be planar.
- the light source may have a mean luminance (or light intensity per unit surface area) over its at least one illuminating zone of between 630 and 140000 cd/m², preferably between 2800 and 6000 cd/m² or between 25000 and 140000 cd/m².
- the luminance may be substantially homogeneous over the whole of the emitting surface.
- the distance between the emitting surface of the light source and the optical sensor may be between 10 and 25 cm.
- the light source may be aligned with the optical axis of the optical imaging system.
- the light source may be aligned with the optical axis of the optical imaging system and the optical sensor observes an illuminating zone of the light source.
- the light source may be aligned with the optical axis of the optical imaging system and the light source comprises a dark zone surrounded by one or more illuminating zones, the optical sensor observing the dark zone.
- the light source may be offset relative to the optical axis of the imaging system.
- the optical sensor may comprise a matrix sensor.
- the portable device may further comprise an image processing unit.

Several example realizations are described in the present disclosure. However, unless otherwise indicated, the characteristics described in relation to any one example realization can be applied to another embodiment or example realization.

The invention will be well understood, and the advantages thereof will become more apparent, upon reading the following detailed description of several nonlimiting examples shown. The description relates to the appended drawings.

FIG. 6 is a comparative table categorizing the code reading results using the method according to the invention, with a light source of luminance 2800 cd/m2 and on glass articles with different light transmission.

FIG. 7 is a comparative table categorizing the code reading results using the method according to the invention, with a light source of luminance 1300 cd/m2 and on glass articles with different light transmission.

FIG. 8 is a comparative table categorizing the code reading results using the method according to the invention, with a light source of luminance 630 cd/m2 and on glass articles with different light transmission.

FIG. 1 illustrates a first embodiment of the manual reading method according to the invention.

Figure 1:
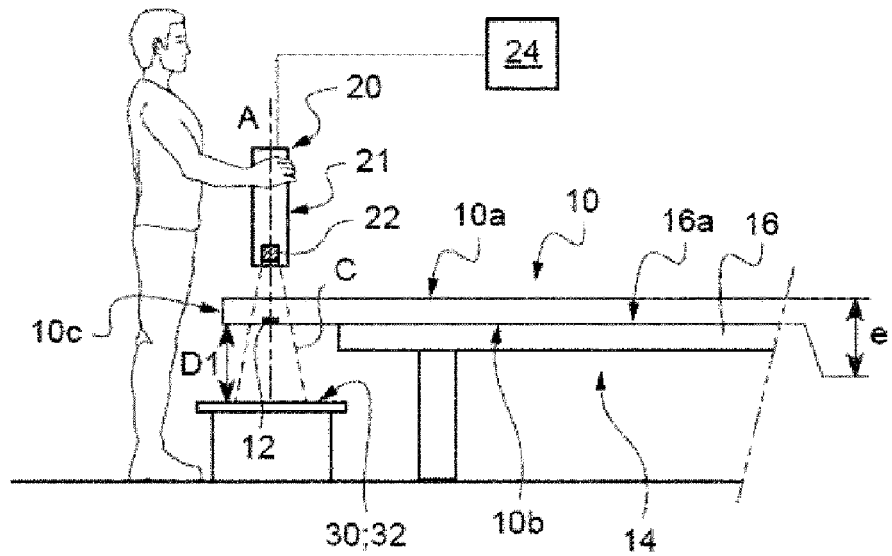
FIG. 1 illustrates a first embodiment of the method of the invention.

The operator wishes to read a code 12 marked close to the periphery of an article 10, in this case a sheet formed of a glass substrate, for example a tinted PLF, hereinafter referred to as "glass sheet" for simplicity.

The light transmission of the glass sheet, measured according to standard NF EN 410, is for example approximately 10%.

Such a glass sheet 10 typically has a first main face 10*a* and a second main face 10*b* which are parallel and opposite, connected by an edge face 10*c*. The thickness e of the glass sheet, measured orthogonally to the main faces, between said faces, is typically between 1.7 and 5 mm.

It should be noted that the glass sheet 10 could, as a variant, consist of the glass substrate coated with one or more layers on one of its faces; or, on the contrary, it could comprise a different number of layers on each of its faces.

In the example, the glass sheet 10 is arranged beforehand on a fixed reading support, in this case in the form of a table 14, the part of said sheet carrying the code 12 being located overhanging the top 16 of the table 14.

Of course, the support for the article could be in any suitable form, particularly that of an A-frame, a suction cup, etc.

The second face 10*b* of the glass sheet 10, here referred to as rear face, is in contact with the upper surface 16*a* of the top 16.

In the illustrated example, the code 12 is a code marked by laser on the second face 10*b* of the glass sheet 10, at a distance of between 2 and 5 mm from the edge face 10*c*. This is for example a two-dimensional code of any suitable type, particularly chosen from the following list: 3-DI code, Aztex Code, Codablock, Code 1, Code 16K, Dot Code, QR Code, ezCode, BeeTagg Big, BeeTagg Landscape, Data Matrix, Maxicode, Snpwflake, Verocode, BeeTagg Hexagon, BeeTagg None, ShotCode, MiniCode, Code 49, Datastrip Code, CP Code, ISS SuperCode.

As an alternative, the code 12 could also be marked in the thickness of the glass sheet 10 or on the first face 10a of the sheet 10.

In accordance with the invention, the second face 10b of the glass sheet 10 is illuminated, in the zone located to the right of the code 12, by a useful light source 30 (hereinafter, and throughout the text, referred to as light source).

According to this first embodiment, the light source 30 is fixed relative to the article support 14. As shown in FIG. 1, here, it is aligned with the code 12 in a direction orthogonal to the main faces 10a, 10b of the glass sheet.

This is typically a white light source, for example an organic light-emitting diode OLED device or an LED device associated with a diffuser, forming a single planar illuminating zone which is substantially parallel to the main faces 10a, 10b of the glass sheet 10.

Advantageously, the distance D1, measured orthogonally to the main faces of the sheet 10a, 10b—between the second main face 10b of the glass sheet 10 and the light source 30 (its illuminating zone 32, in other words its emitting surface) is between 6 and 16 cm, preferably between 10 and 14 cm.

The luminance of the light source 30 is, preferably, substantially homogeneous over the whole of the illuminating zone 32 in order to ensure that the code is illuminated homogeneously over its whole surface.

The mean luminance is typically between 630 and 140000 $cd/m^2$.

The operator wishing to read the code 12 is located on a first side of the glass sheet 10 where they face the first face 10a of the glass sheet 10, here referred to as front face.

In order to read the code from the first side of the glass sheet 10, they use, according to the invention, a portable device 20 equipped with an optical imaging system 21 comprising at least one optical sensor 22, for example a matrix sensor, as well as, generally, a system of lenses and an integrated light source located around the lens system (not shown here).

As shown in FIG. 1, the optical sensor 22 can be defined by its general observation direction, corresponding here to its optical axis A, and by its field of observation C, which depends on the size of the sensor and on the lens system.

The portable device 20 is configured to be held in the hands and moved spatially by the operator.

As shown in FIG. 1, the portable device 20 is positioned on the first side of the glass sheet 10 with the optical sensor 22 facing the code 12 in a reading direction corresponding to the optical axis A.

In this position, and in accordance with the previously described arrangement, the optical sensor 22 observes the illuminating zone 32 of the light source 30. The illumination thus obtained is said to be bright field illumination: this is direct illumination, i.e. oriented directly toward the optical sensor 22.

In order to ensure such illumination while taking into account the positional inaccuracies of the portable device 20, it is advantageous for the surface of the illuminating zone 32 of the light source 30 to be large, advantageously at least 10 times greater than the surface of the code 12 itself, and typically between 5 and 900 $cm^2$.

In this position, the operator actuates a switch or a trigger in order to initiate the capture of images by the sensor 22. The optical sensor 22 then captures an image of the code.

The image is then transmitted to a suitable image processing unit which makes it possible, for example, to detect the presence of the code, to locate it, to correct the form and contrast in order to then be able to decode the code, and which may form part either of the portable device 20 or of an external structure such as a computer or a tablet, for example wirelessly connected to the portable device 20.

In the case of a bright field type illumination as defined previously, it has been observed that the combination of a mean luminance of the light source 30 of between 2800 and 6000 $cd/m^2$, associated with a distance between the second main face 10b of the glass sheet 10 and the light source of between 6 and 16 cm, preferably between 10 and 14 cm, makes it possible to read the code regardless of the light transmission of the article.

By way of illustration, FIGS. 6 to 8 provide results of tests for three different mean luminances: 2800 $cd/m^2$ for the tests of FIG. 6, 1300 $cd/m^2$ for FIG. 7, 630 $cd/m^2$ for FIG. 8.

For each luminance level, readings were taken on three different types of glass having different light transmissions (LT), respectively of 10, 70 and 92%. For each glass, the distance D1 was successively modified to assume values of between 6 and 80 cm.

It is observed that reading a code marked on the glass is easy for any glass, regardless of its light transmission, when the mean luminance is equal to 2800 $cd/m^2$ and the distance D1 is 10 or 14 cm.

Figure 2:
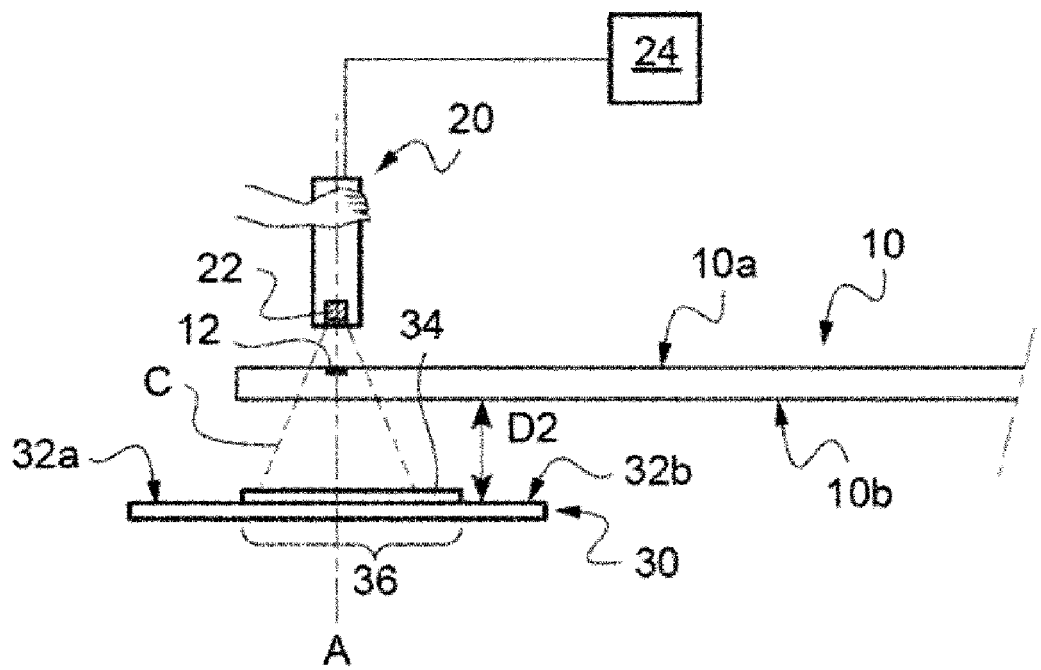
FIG. 2 illustrates a second embodiment of the method of the invention.
Figure 3:
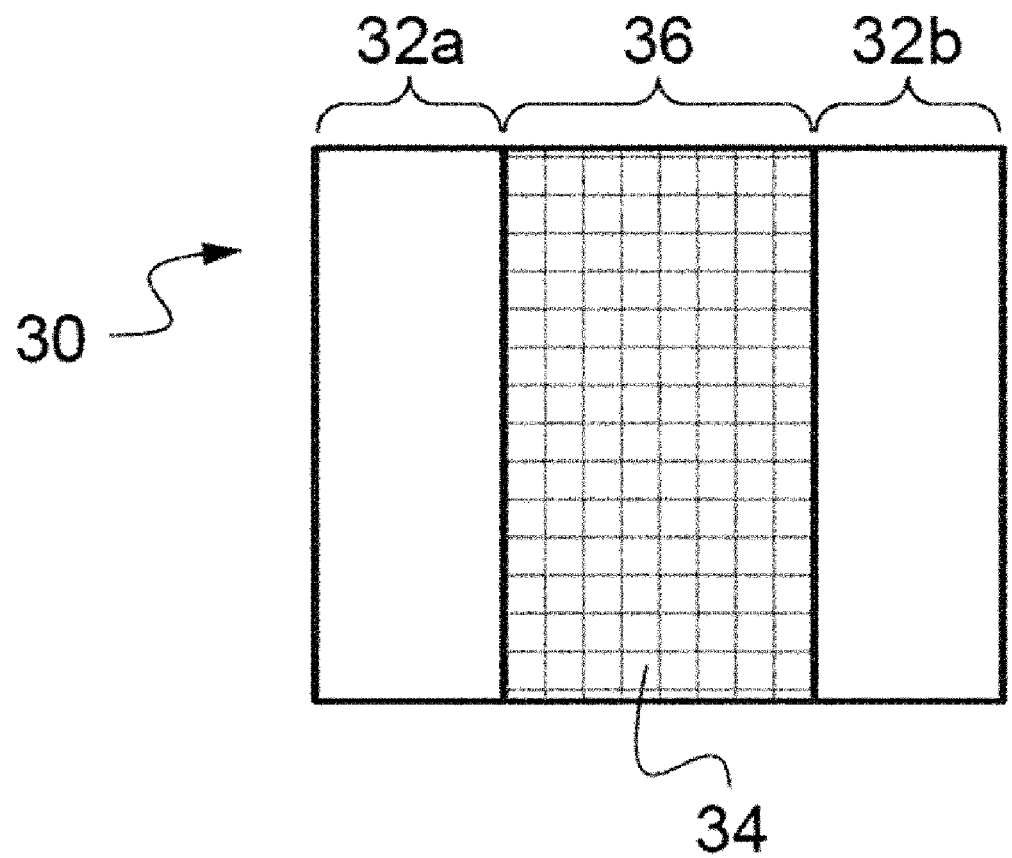
FIG. 3 illustrates an element of FIG. 2.

FIGS. 2 and 3 illustrate a second embodiment in which the illumination of the code 12 is no longer of the bright field type as described previously, but is of dark field type.

According to this second embodiment, the light source 30 is still aligned with the optical axis A of the optical imaging system 21 at the time of the reading. In particular, the light source 30 is aligned here with the code 12 in a direction orthogonal to the main faces 10a, 10b of the article, and the portable device 20 is oriented by the operator so that the optical sensor 22 faces the code 12 in a reading direction corresponding to the optical axis A of the imaging system 21.

In order to obtain the dark field type illumination, a mask 34 (see FIGS. 2 and 3) is arranged so as to mask part of the light source 30 and form a dark zone 36 surrounded by two illuminating zones 32a, 32b. The field of observation C of the optical sensor 22 is oriented toward this dark zone 36. As shown in FIG. 3, no illuminating zone 32a, 32b then encounters the field of observation C of the optical sensor 22. With these provisions, the code can advantageously appear luminous on a completely black background, and thus enable a better contrast. Preferably, the optical axis A of the imaging device 21 is centered on the middle of the dark zone 36.

Generally, the mask 34 is of any type suitable for producing at least one dark zone 36 and at least one illuminating zone from a single initial illuminating zone. For example, the mask 34 can have the form of a strip parallel to the two illuminating zones 32a, 32b, which themselves form two illuminating strips. More particularly, the mask 34 can also have the form of a disk at the center of a ring-shaped illuminating zone.

The dark zone 36 is preferably wider than the field of observation C of the optical sensor 22, so that the edges of the image captured by the sensor 22 are well into the dark zone.

Moreover, advantageously, the distance D2 between the light source 30 and the second main face 10b of the glass sheet 10, measured orthogonally to the main faces of the article, is between 1 and 5 cm.

It should be noted that, in FIG. 2, the code 12 is marked on the first main face 10a of the glass sheet 10, but as a variant, it could be marked on the second face 10b or in the thickness of the sheet 10.

It should be noted, moreover, that in the case of a dark field type illumination as described in conjunction with the second or third embodiment, the light source 30 has a mean luminance over its illuminating zone of between 630 and 140000 cd/m², preferably of between 25000 and 140000 cd/m².

Figure 4:
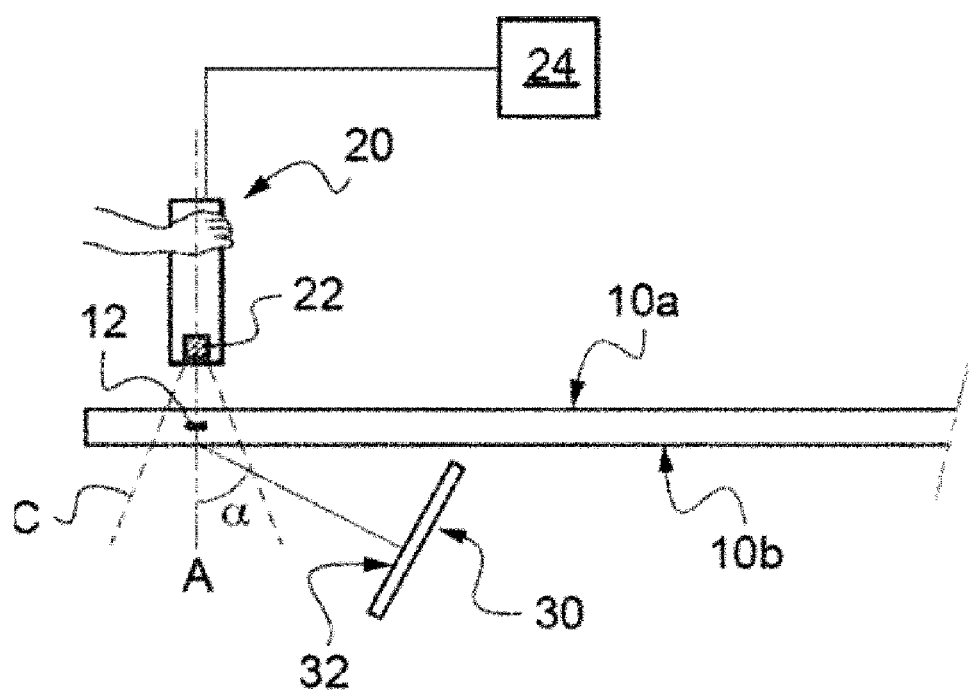
FIG. 4 illustrates the method according to a third embodiment of the invention.

FIG. 4 illustrates a third embodiment in which the illumination is of dark field type. In this embodiment, however, the light source 30 is offset relative to the optical axis A of the imaging system, such that it is located outside the field of observation C of the sensor 22.

In the example, more particularly, the source 30 extends and illuminates in a direction which forms an angle α with an axis intersecting the code 12 and orthogonal to the main faces 10a, 10b of the glass sheet 10. The angle α is typically between 5 and 80°.

It should be noted that, in FIG. 3, the code 12 is marked this time in the thickness of the glass sheet 10. As a variant, it could nonetheless be marked on the first main face 10a or second main face 10b.

The invention provides, as an advantageous variant, for the portable device to integrate the optical imaging system 21 and the light source 30.

In this case, the portable system is configured so that the light source which it integrates can be positioned on the second side of the article, so as to act in the same way as described in conjunction with the previous embodiments, particularly by facilitating the reading off of a code of degraded quality by highlighting the symbols relative to the defects or by enabling the imaging of a code located on the second face or in the volume of the article when this article has a low light transmission.

Figure 5:
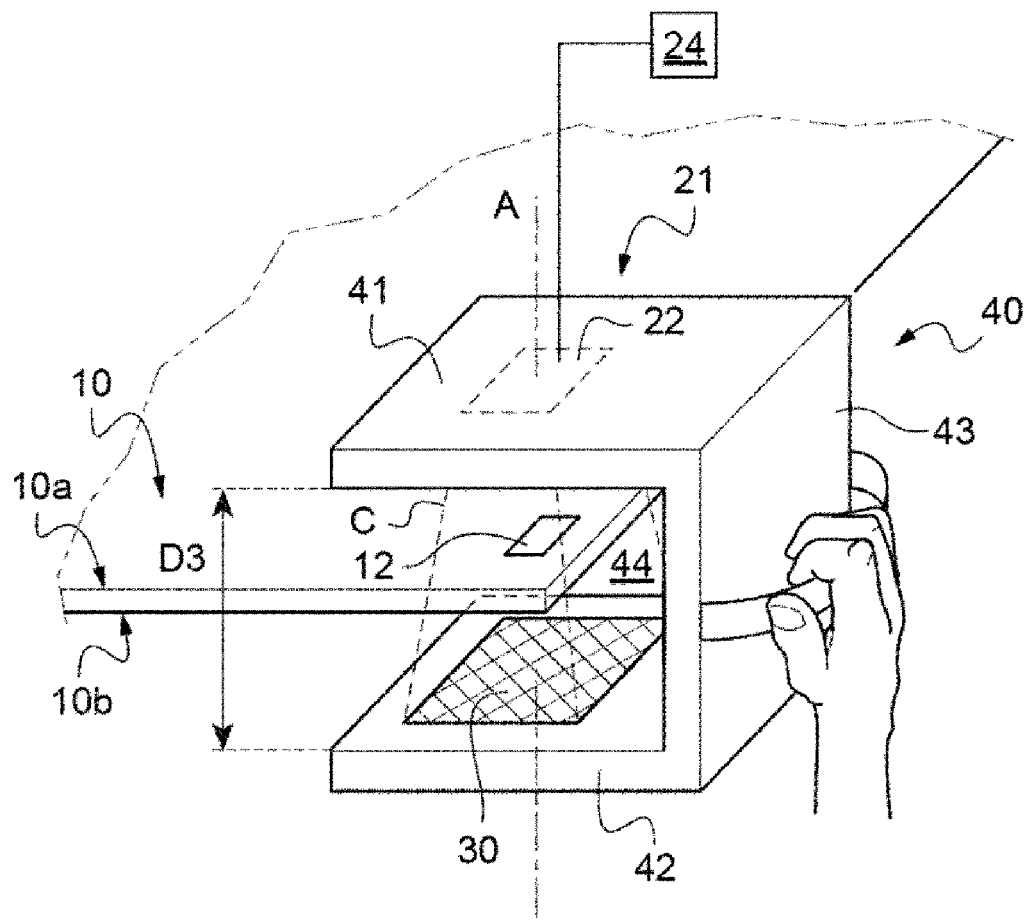
FIG. 5 illustrates a portable device which is particularly suitable for implementing the method according to a fourth embodiment.

FIG. 5 illustrates such a portable device 40, comprising:
a first branch 41 carrying the optical imaging system 21
a second branch 42 carrying the light source 30, and
an intermediate branch 43 connecting the first and second branches 41, 42 to one another.

The portable device 40 thus has an overall U shape, the intermediate branch 43 forming the base of the U and the first and second branches being spaced apart from one another so as to define a receiving space 44 between them.

Advantageously, at least one of the branches, particularly the intermediate branch 43 as in the illustrated example, further comprises gripping means 45, for example in the form of a handle, enabling the device 40 to be held in the operator's hands.

In the example, the light source 30 comprises a single illuminating zone 32 formed for example by an organic light-emitting diode OLED device, or at least one LED device associated with a diffuser.

The light source 30 is aligned with the optical axis of the optical imaging system 21 and the optical sensor 22 directly observes the illuminating zone 32, the surface area of which is preferably between 5 and 40 cm².

Advantageously, the light source 30 has a mean luminance over its illuminating zone of between 630 and 140000 cd/m², preferably of between 2800 and 6000 cd/m².

Moreover, the distance D3 measured between the light source and the optical sensor is preferably between 10 and 25 cm.

The illumination is therefore similar to that of the first embodiment described previously in conjunction with FIG. 1. As a variant, it could also be of dark field type and arranged as described in the second and third embodiments described previously. In this case, advantageously, the light source 30 has a mean luminance over its illuminating zone of between 630 and 140000 cd/m², preferably of between 25000 and 140000 cd/m².

For reading the code 12, the portable device 40 is taken in the operator's hands and deployed around an edge of the article 10 in a position—illustrated in FIG. 5—in which the optical sensor 22 is located on the first side of the article, facing the code 12 in a reading direction corresponding to the observation direction (here the optical axis A) of the imaging system, and the light source 30 is arranged on the second side of the article 10.

The applicant carried out different comparative code reading tests, with several types of glass and different reading conditions. In all of the tests carried out, the code was marked on the second main face of the article (in order words the one opposite the operator).

The results are as follows:

Comparative test no. 1 relates to the reading of a code on a glass article 4.85 mm thick, sold by the applicant under the name of VG10 Comfortsky (the transmission thereof is 10%).

Without a light source on the second side of the article, for two different positions of the reading device, it was observed that the code is not visible.

When the code is illuminated by a light source on the second side of the article, in bright field type illumination (the light source is aligned with the optical axis of the optical imaging system and the optical sensor observes an illuminating zone of the light source), the code is clearly visible and read off instantly.

Comparative test no. 2 relates to the reading of a code on a glass article 2.1 mm thick, sold by the applicant under the name of VG10 Comfortsky. In this test, the zone of the article carrying the code is soiled by a fingerprint on the surface of the glass.

When the code is illuminated by a light source placed on the second side of the article, in bright field type illumination, the code is visible, the fingerprint is not visualized and the code is read off instantly.

In the absence of a light source, the code is masked by the fingerprint and the code is difficult to read.

Comparative test no. 3 relates to the reading of a code on a glass article 1.8 mm thick, sold by the applicant under the name of TSA 1.8 (of light transmission equal to 70%).

When the code is illuminated by a light source placed on the second side of the article, in bright field type illumination, the contrast is good: the code is visualized in black (it makes a shadow) on a background which appears light and is thus read off instantly. When the source is turned off, whether the code is visualized on a white background or a black background, the code is visualized in white (it scatters) and is not visible as the contrast is insufficient.

Comparative test no. 4 relates to the reading of a code on a glass article, sold by the applicant under the name of XN (of light transmission equal to 80%). Here, the face is dusty and the code is of poor quality. In the absence of a light source on the second side of the article, the code is not readable as it is of mediocre quality (whether the code is observed on a white background or black background).

When the code is illuminated by a light source on the second side of the article, in accordance with the invention, the code becomes black and is read off instantly.

The invention claimed is:

1. A method for manually reading a code marked on a glass article, the glass article having a first main face on a first side and a second main face, opposite the first main face, on a second side, the method comprising:
- with the glass article being fixed, positioning a portable device equipped with an optical imaging system comprising at least one optical sensor on the first side of the glass article so as to place the optical sensor facing the code in a reading direction corresponding to an observation direction of the optical imaging system, and
- with the code being illuminated by a light source that is located on the second side of the glass article and that emits light towards the second main face of the glass article, acquiring at least one image of the code by the optical imaging system.

2. The method according to claim 1, wherein, during reading of the code, the light source is aligned with the observation direction of the optical imaging system.

3. The method according to claim 2, wherein, during the reading, the optical sensor observes an illuminating zone of the light source.

4. The method according to claim 1, wherein a distance between the light source and the code is between 6 and 16 cm.

5. The method according to claim 2, wherein the light source comprises at least one dark zone surrounded by one or more illuminating zones and, during the reading, the optical sensor observes a dark zone of the light source.

6. The method according to claim 1, wherein, during the reading, the light source is offset relative to an optical axis of the optical imaging system.

7. The method according to claim 1, wherein the glass article has a light transmission of between 1 and 70%.

8. The method according to claim 1, wherein the light source has at least one illuminating zone and a luminance of the light source over said illuminating zone is such that an homogeneity thereof, calculated as being 1−E/Lmean, is greater than 0.5, where E is a standard deviation of the luminance over its at least one illuminating zone and Lmean is a mean luminance over said illuminating zone.

9. The method according to claim 1, wherein the light source has at least one illuminating zone and the mean luminance thereof over its at least one illuminating zone is between 630 and 140000 cd/m$^2$.

10. The method according to claim 1, wherein the code is marked on the second face of the glass article or in a thickness of the glass article.

11. The method according to claim 1, comprising a preliminary step of positioning the article in front of the light source, said light source being fixed.

12. The method according to claim 1, wherein the portable device integrates the optical imaging system and the light source, and said portable device is deployed around an edge of the glass article in a position in which the optical sensor is located on the first side of the glass article facing the code in a reading direction corresponding to the observation direction of the optical imaging system, and the light source is arranged on the second side of the glass article.

13. A portable device for implementing the method according to claim 1, integrating an optical imaging system comprising at least one optical sensor, and a light source, the portable device being configured to be deployed around an edge of the glass article in a position in which the optical sensor is located on the first side of the glass article facing the code in a reading direction corresponding to the observation direction of the optical imaging system, and the light source is arranged on the second side of the glass article.

14. The portable device according to claim 13, comprising a first branch carrying the optical imaging system and a second branch carrying the light source, the first and the second branches being spaced apart from one another so as to define a receiving space between them.

15. The portable device according to claim 13, further comprising gripping means.

16. The portable device according to claim 13, wherein the light source comprises at least one organic light-emitting diode OLED device, or at least one LED device, associated with a diffuser.

17. The portable device according to claim 13, wherein the light source has a mean luminance over its at least one illuminating zone of between 630 and 140000 cd/m$^2$.

18. The portable device according to claim 13, wherein a distance between the light source and the optical sensor is between 10 and 25 cm.

19. The portable device according to claim 13, wherein the light source is aligned with the optical axis of the optical imaging system.

20. The portable device according to claim 19, wherein the optical sensor observes an illuminating zone of the light source.

21. The portable device according to claim 19, wherein the light source comprises a dark zone surrounded by one or more illuminating zones, the optical sensor observing the dark zone.

22. The portable device according to claim 13, wherein the light source is offset relative to the optical axis of the optical imaging system.

23. The portable device according to claim 13, wherein the optical sensor comprises a matrix sensor.

24. The method according to claim 1, wherein:
(a) the portable device is movable relative to the light source during said positioning, or
(b) the light source is part of the portable device that further includes a first branch for carrying the optical imaging system, a second branch for carrying the light source and an intermediate branch that connects the first and the second branch, the intermediate branch extending along an edge of the glass article during acquisition of the at least one image.

* * * * *